US009390361B2

(12) United States Patent
Wulff et al.

(10) Patent No.: US 9,390,361 B2
(45) Date of Patent: Jul. 12, 2016

(54) METHOD AND APPARATUS FOR VERIFYING INFORMATION ASSOCIATED WITH ELECTRONIC LABELS

(75) Inventors: Thomas E. Wulff, North Patchogue, NY (US); Robert Sanders, St. James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 496 days.

(21) Appl. No.: 13/329,847

(22) Filed: Dec. 19, 2011

(65) Prior Publication Data

US 2013/0155815 A1   Jun. 20, 2013

(51) Int. Cl.
*G01S 15/06* (2006.01)
*G06K 19/07* (2006.01)
(Continued)

(52) U.S. Cl.
CPC ............. *G06K 19/0728* (2013.01); *G01S 15/46* (2013.01); *G01S 2015/465* (2013.01); *G06K 2017/0051* (2013.01)

(58) Field of Classification Search
CPC ............... G01S 1/06; G06K 7/01; G06F 7/04; G09G 3/34
USPC ............... 367/99, 89, 100, 87, 101, 103, 105, 367/107, 123, 127, 131, 139, 159, 173, 4, 7, 367/93; 33/701; 73/114.28, 290 R, 632; 83/697; 114/121, 144 R, 152, 321; 156/281; 235/385, 375, 378, 383, 235/462.46; 250/491.1, 208.1, 336.1, 395; 257/E29.324, 416; 310/322, 334, 335, 310/345; 340/5.1, 5.91, 8.1, 10.32, 10.4, 340/10.52, 3.7, 505, 539.32; 341/176; 342/42, 44, 51, 118, 124, 146, 22, 342/357.24, 357.26, 70; 345/156; 348/E7.085, 135, 77; 356/0.01, 601, 356/614, 5.01, 623, 72; 376/245; 381/190; 404/72, 84.5; 422/513; 600/437, 449; 701/16, 2, 21, 23, 300, 428, 50; 702/150, 155, 55; 707/609, 722, 769; 901/46

See application file for complete search history.

(56) References Cited

U.S. PATENT DOCUMENTS 5,442,343 A * 8/1995 Cato et al. .................... 340/5.91
6,046,682 A * 4/2000 Zimmerman et al. ......... 340/8.1
(Continued)

FOREIGN PATENT DOCUMENTS

EP    2 101 291 A1    9/2009
JP    2005-316863 A   11/2005
WO   2004/051304 A1   6/2004

OTHER PUBLICATIONS

Shrestha et al.; Ultrasonic Positioning System. Final Project Report E3390 Electronic Circuits Design Lab, Columbia University, May 10, 2010.*

(Continued)

*Primary Examiner* — Luke Ratcliffe
*Assistant Examiner* — Amienatta M Ndure Jobe
(74) *Attorney, Agent, or Firm* — Nong-Qiang Fan

(57) ABSTRACT

Embodiments are directed to methods and apparatuses for determining and verifying a location of an electronic label. A host system exchange information with the electronic label via ultrasonic data communication. The host system also identifies a location of the electronic label using an ultrasonic location technique. The host system also verifies that the electronic label is correctly located by comparing a calculated location of the electronic label with a known location of merchandise associated with the electronic label.

17 Claims, 4 Drawing Sheets

(51) Int. Cl.
*G01S 15/46* (2006.01)
*G06K 17/00* (2006.01)

(56) References Cited

U.S. PATENT DOCUMENTS

| | | | |
|---|---|---|---|
| 6,046,683 A * | 4/2000 | Pidwerbetsky et al. | 340/10.4 |
| 6,089,453 A * | 7/2000 | Kayser et al. | 235/383 |
| 6,715,676 B1 | 4/2004 | Janning | |
| 6,718,341 B1 | 4/2004 | Berstis et al. | |
| 6,924,781 B1 * | 8/2005 | Gelbman | 345/85 |
| 7,378,968 B2 * | 5/2008 | Wang et al. | 340/572.4 |
| 2006/0135080 A1 * | 6/2006 | Khandekar et al. | 455/69 |
| 2009/0231135 A1 * | 9/2009 | Chaves et al. | 340/572.1 |
| 2011/0133902 A1 * | 6/2011 | Pang et al. | 340/10.3 |
| 2012/0092134 A1 * | 4/2012 | Stern et al. | 340/10.1 |

OTHER PUBLICATIONS

Gunderson, et al.; Naval Total Asset Visibility (NTAV) Precision Asset Location (PAL)—System Tests on the SS Curtiss, Jan. 2004.*
Peneda, et al.; Naval Total Asset Trilateration for Indoors Positioning Within the Framework of Wireless Communications, Institute for Systems and Robotics, Faculty of Engineering, University of Porto, Porto, Portugal, 2009 IEEE.*
Jime'nez et al.; Ultrasonic Localization Methods for Accurate Positioning Instituto de Automa'tica Industrial. CSIC. Sep. 29, 2005.*
International Search Report for counterpart International Patent Application No. PCT/US2012/067960 mailed Feb. 22, 2013.

* cited by examiner

METHOD AND APPARATUS FOR VERIFYING INFORMATION ASSOCIATED WITH ELECTRONIC LABELS

FIELD OF THE DISCLOSURE

The present disclosure relates generally to electronic labels and more particularly to providing an avenue for verifying that the electronic label is correctly located within the enterprise with respect to associated merchandise.

BACKGROUND

Manual printed labels may be used to provide information on objects, such as shelves, on which products are located. The manual printed labels need to be constantly updated and/or changed to reflect changes in the information being displayed. For example, manual printed labels need to be constantly updated to reflect changes in product pricing. There are several drawbacks to using manual printed labels. For example, the need to constantly update manual printed labels increases labor and material costs associated with managing displayed information. There is also a certain amount of lag time between when an establishment decides to change displayed information, such as product pricing, and when the information displayed is actually updated. Information displayed on manual printed labels is also susceptible to mistakes caused by human error and/or the labels themselves are susceptible to being located at or on the incorrect merchandise (for example, a shelf label being placed on the wrong shelf).

One application of electronic labels is Electronic shelf labels (ESL). Electronic shelf labels are used to provide information on objects on which products are displayed. Typically, electronic display modules are attached to the front edge of the shelves, similar to the manual printed shelf labels that are widely deployed today. A system employing ESL may include one or more electronic display modules, such as Liquid Crystal Display (LCD) or similar technology, which can be used to display information about associated products. The ESL system may also include a wireless radio module with a power source, for example a battery. The radio is configured to transmit radio frequency (RF) signals to one or more electronic shelf labels, or access points within range.

Information, such as pricing information, sent from the host system or access points to one or more electronic shelf labels may be obtained from a processor/server in communications with the access points. This enables the ESL system to automatically update displayed prices in less time than it takes to update manual printed shelf labels. Updated information displayed in ESL systems are generally more accurate than those displayed on manual printed shelf labels and the labor and material costs for managing displayed information in ESL systems are less than the costs associated with manual printed shelf labels.

Because of the components, such as the radios used in the ESL systems, the initial startup costs associated with ESL systems are more than the startup costs associated with manual printed labels. In addition, there are no known automated systems for verifying the information displayed on electronic shelf labels is correctly located within the enterprise. In other words, there is no way to ensure that a current price being displayed on an electronic shelf label is the correct price for the associated merchandize on the display shelf.

Accordingly, there is a need for a method and apparatus for reducing the costs associated with an electronic labeling system and for providing an avenue for verifying that the electronic label is correctly located within the enterprise with respect to associated merchandise.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
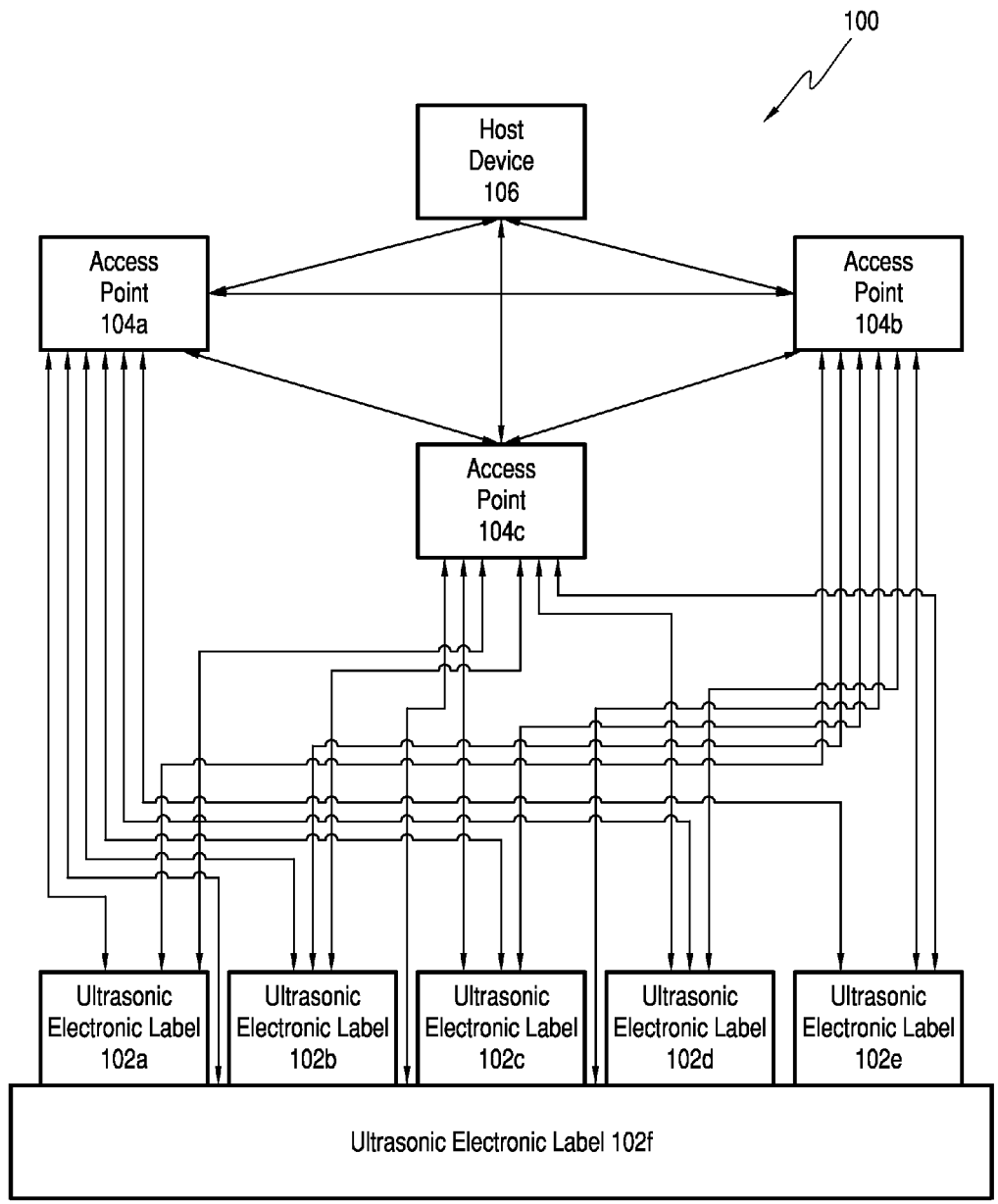
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for determining and verifying a location of an electronic label. A host system exchanges information with the electronic label via ultrasonic data communication. The host system also identifies a location of the electronic label using an ultrasonic location technique. In response to identifying the location of the electronic label, the host system also verifies that the electronic label is correctly located by comparing a calculated location of the electronic label with a known location of merchandise associated with the electronic label.

FIG. 1 is a block diagram of a system used in accordance with some embodiments. System 100 includes ultrasonic electronic labels 102, access points 104 and a host device 106. Ultrasonic electronic labels 102 may be affixed to display objects, such as shelves or racks, to provide information, such as pricing, about the products display on the shelves or racks. In FIG. 1, ultrasonic electronic label 102f is affixed on a shelf used to display products. Ultrasonic electronic labels 102 may also be affixed or attached to the products displayed on the shelves or racks. In FIG. 1, ultrasonic electronic labels 102a-102e are affixed to products displayed on the shelf associated with ultrasonic electronic label 102f.

Each ultrasonic electronic label 102 is configured to convey information identifying the type of item to which it is attached or affixed. It should be noted that ultrasonic electronic labels 102 may be affixed or attached to individual items or to a group of items. Ultrasonic electronic labels 102 include an ultrasonic transceiver, a processor module, an information component, and a power source. The information component may be a display component, such as a Liquid Crystal Display (LCD) or similar technology. The information component may also be a notification component.

Ultrasonic electronic labels 102 may communicate directly with one or more access points 104 or host devices 106 via known ultrasonic data communication means. For example, in FIG. 1, each of ultrasonic electronic labels 102 communicates directly with each access point 104a-104c. Each access point 104 is configured to broadcast an encoded ultrasonic waveform to each ultrasonic electronic label 102. When the encoded ultrasonic waveform is decoded in each ultrasonic electronic label 102, the decoded information is used to update information displayed on the ultrasonic electronic label 102. In addition to sending encoded ultrasonic waveform to each ultrasonic electronic label 102, each access point 104 is configured to receive response signals from each ultrasonic electronic label 102.

Response signals received from each ultrasonic electronic label 102 in response to queries sent to each ultrasonic electronic label 102 are used to obtain data, such as an identification number of each responding ultrasonic electronic label 102. Access points 104 may then transmit the data obtained from ultrasonic electronic labels 102 to a host device 106. Access points 104 may be wireless connected to host device 106 via, for example, Wireless Fidelity (Wi Fi). Access points 104 may also be connected to host device via wired connections.

Prior to receiving information from each ultrasonic electronic label 102, host device 106 obtains information about merchandise in an establishment. For example, host device may determine where merchandise is located in the establishment through interrogation of tags affixed to merchandise. Host device 106 may determine the locations of merchandise through, for example, radio frequency identification interrogation or through ultrasonic interrogation techniques. Thereafter, when host device 106 receives information from an ultrasonic electronic label 102, host devices uses the known location information of the merchandise associated with the ultrasonic electronic label 102 to verify the location of the ultrasonic electronic label 102. For example, when host device 106 receives information from ultrasonic electronic label 102*f*, host device 106 uses known location information for merchandise associated with the ultrasonic electronic label 102*f* or uses known information received from ultrasonic electronic labels 102a-102e associated with ultrasonic electronic label 102*f* to verify the location of the ultrasonic electronic label 102*f*.

In some embodiments, host device 106 verifies the location of ultrasonic electronic label 102*f* by comparing the known location(s) of merchandise associated with ultrasonic electronic label 102*f* with a calculated location of ultrasonic electronic label 102*f*. If the known location of merchandise associated with ultrasonic electronic label 102*f* is close or similar to the calculated location of ultrasonic electronic label 102*f*, host device 106 can verify that ultrasonic electronic label 102*f* is accurately located relative to the related merchandise. Upon verifying the location of the ultrasonic electronic label 102*f*, host device is configured to also verify that the correct information is being displayed on ultrasonic electronic label 102*f*. In some embodiments, if the known location of merchandise associated with ultrasonic electronic label 102*f* is different from the calculated location of ultrasonic electronic label 102*f*, host device 106 can identify and report to, for example a sales associate, at least one of the calculated location of ultrasonic electronic label 102*f* and/or the known location of merchandise associated with ultrasonic electronic label 102*f*. The reported information may be used to relocate ultrasonic electronic label 102*f* within an enterprise.

Some embodiments of system 100 utilize ultrasonic locationing for determining the locations of ultrasonic electronic labels 102 attached to products and to shelves. The ultrasonic locationing may be accomplished by, for example, a trilateration technique or a quadlateration technique. In the trilateration or the quadlateration techniques, three or more spatially known access points 104 calculate the distance between each other and to an ultrasonic electronic label 102. Some embodiments use a single access point with multiple, for example three or four, ultrasonic transducers. Similar to the trilateration technique or quadlateration technique, the ultrasonic transducers calculate the distance between each other and to an ultrasonic electronic label 102. The access point(s) use the calculated distance to determine a specific location of the ultrasonic electronic label 102.

Figure 2:
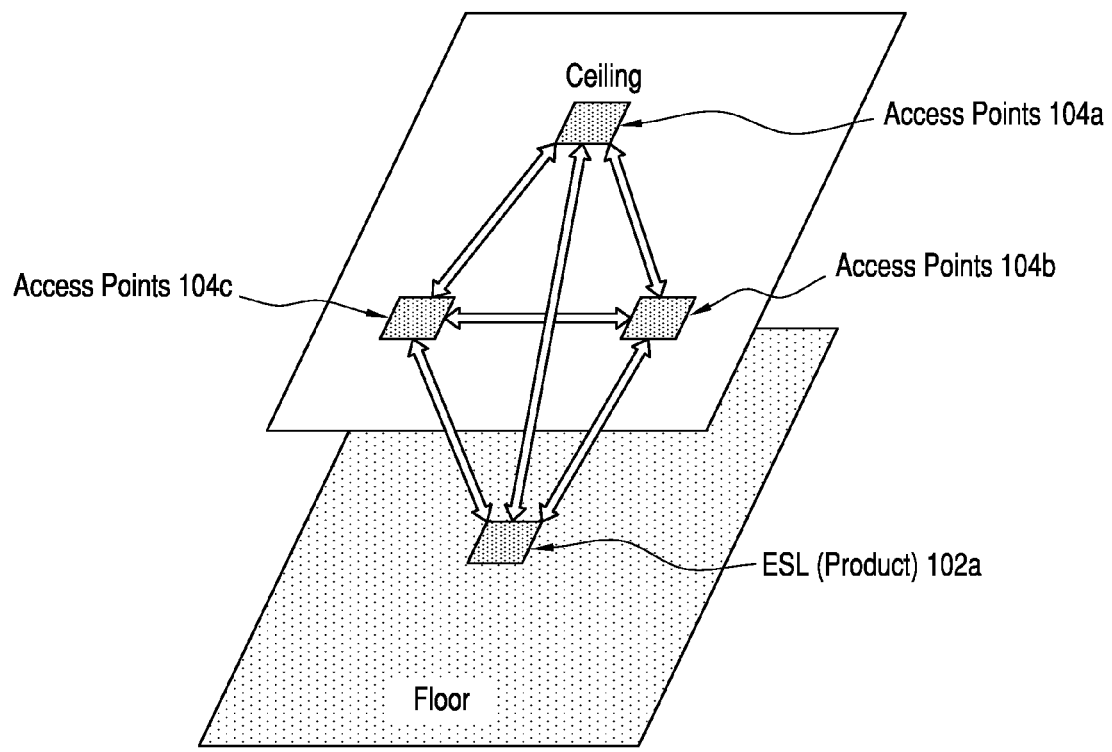
FIG. 2 is a block diagram of a trilateration location technique used in accordance with some embodiments.

FIG. 2 is a block diagram of a trilateration technique used in accordance with some embodiments. Three overhead access points 104a-104c determine the distance between each other by calculating the Time Difference of Arrival (TDoA) of their respective ultrasonic signals and create a triangle. It is not necessary that the access points be located overhead. Thereafter, each of the three spatially known access points 104a-104c determine their distances to ultrasonic electronic label 102a affixed to a product via similar TDoA ultrasonic techniques, creating three more triangles. Calculating all the relative distances, and subsequent relative angles, between the access points and electronic labels enables a spatial mathematical solution to be calculated for the location of the electronic labels. In general, each of the three spatially known access points 104a-104c determines its position relative distance to the ultrasonic electronic labels 102a-102e attached to merchandise and ultrasonic electronic label 102*f* attached to shelves.

In FIG. 2, the radio module used in conventional electronic shelf labeling systems for data communications could be replaced with a transducer, for example a piezo electric element, which generates sound waves in the ultrasonic range, above 18,000 hertz, by turning electrical energy into sound energy. When the echo is received from the transmitted sound, the transducer turns the sound waves into electrical energy which can be measured and displayed. As described, these ultrasonic signals can be used for data communications, whereby, the access points, or other host devices, communicate with the electronic shelf labels via encoded/decoded ultrasonic waveforms.

Based on the calculated distance from access points 104a-104c to, for example, ultrasonic electronic label 102a the location of ultrasonic electronic label 102a is calculated. In some embodiments, access points 104 may transmit the calculated locations from the ultrasonic electronic labels 102 attached to products and ultrasonic electronic labels 102 attached to shelves to host device 106. In other embodiments, access points 104 may transmit the calculated distance from each access point 104a-104c to each ultrasonic electronic label 102 to host device 106 and host device may use the calculated distance to calculate the precise location of each ultrasonic electronic label 102.

When compared to other radio frequency based technologies, such as Wi Fi or Radio Frequency Identification (RFID), the described ultrasonic locationing technique is very accurate in determining the location of the electronic labels within an enterprise. Upon determining the location of the electronic labels within the enterprise, host device 106 can use the location information obtained from access points 104 to verify that each ultrasonic electronic label is attached to the proper display location. In other words, host device 106 can use known location information for merchandise that are to be associated with an ultrasonic electronic label and the calculated location information for the ultrasonic electronic label to verify that the ultrasonic electronic label is correctly attached to a display location for merchandise associated with the ultrasonic electronic label (for example, host device 106 can verify that the correct pricing information is in the correct ultrasonic electronic label 102 attached to a display location with respect to a specific merchandise). The location and pricing information could also be displayed electronically for internal management via store electronic planograms, a floor plan, or an internal map.

Ultrasonic electronic labels 102 may also be affixed or attached to apparel hang tags/merchandise tags. Each hang tag may be configured to display the latest pricing information via an electronic display module, for example LCD on the hang tag. The information displayed on the ultrasonic hang tag may be updated according to the ultrasonic data communication process outlined above. The location of each ultrasonic hang tag would also be calculated, for example, as per the ultrasonic trilateration process outlined above. The hang tags may not only provide the latest pricing information, they could also serve an Electronic Article Surveillance (EAS) function. EAS is known technique for protecting merchandise against unauthorized removal from an establishment. The ultrasonic hang tags are therefore configured to include ultrasonic electronic sensors that may be deactivated and/or detached at a point of sale system when the item attached to the ultrasonic hang tag is purchased. These ultrasonic hang tags may therefore be attached to and removed from merchandise via current EAS tagging techniques. Ultrasonic detectors at exits or checkout point in the establishment may be used to detect unauthorized removal of merchandise from the establishment. For example, when merchandise attached to an activated ultrasonic hang tag is being removed from the establishment, the ultrasonic detectors may detect the activated ultrasonic hang tag and sound an alarm.

Because the ultrasonic hang tags used in some embodiments can be detached from merchandise at the point of sale system, the ultrasonic hang tags can be re-attached to new merchandise, wherein the price displayed on each ultrasonic hang tag would be updated electronically to reflect the price of the attached merchandise. Ultrasonic tags function with metal and liquids, thereby making it very difficult to conceal tagged merchandise during unauthorized removal of the merchandise from the establishment. For example, placing merchandise with the ultrasonic hang tags in aluminum foiled shopping bags or other bags that can be used to conceal current EAS tags (radio frequency (RF) or magnetic based) would now be detectable with the ultrasonic hang tags because the ultrasonic hang tags remain functional with metals and liquids.

Figure 3:
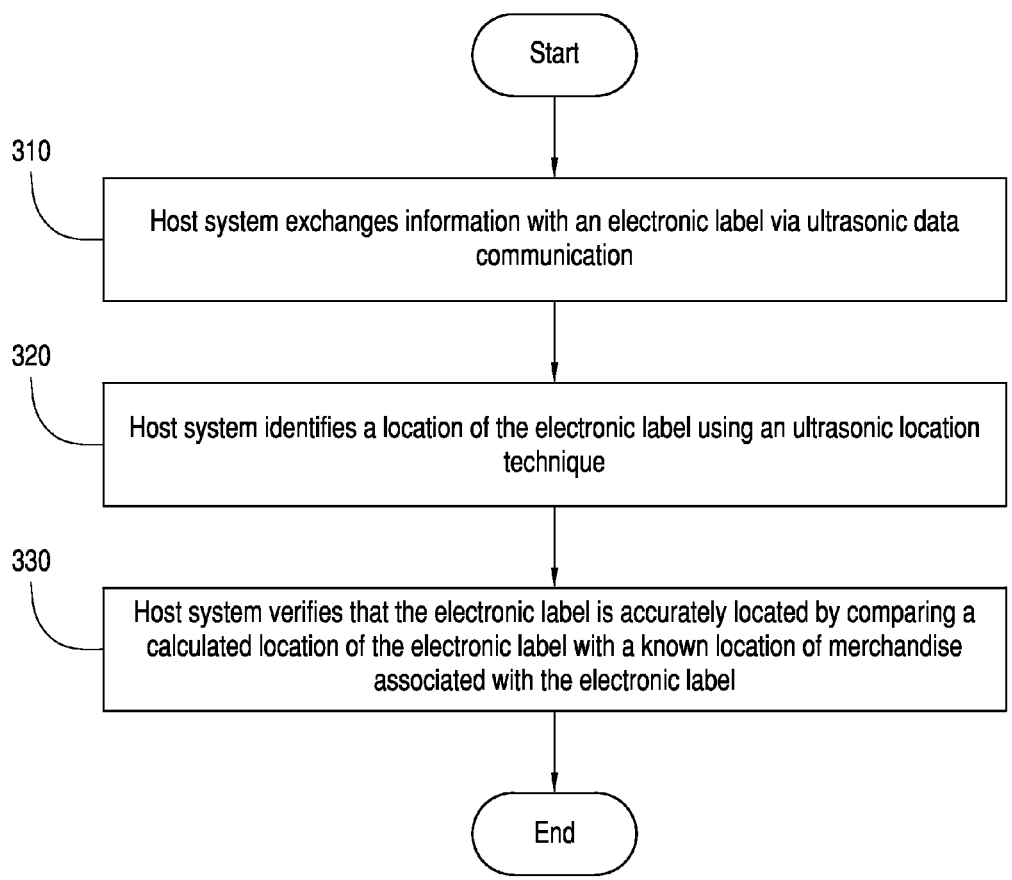
FIG. 3 is a flow diagram of a method for determining and verifying the location of an ultrasonic electronic label in accordance with some embodiments.

FIG. 3 is a flow diagram of a method for determining and verifying the location of an ultrasonic electronic label in accordance with some embodiments. In 310, a host system exchanges information with the electronic label via ultrasonic data communication. In 320, the host system identifies a location of the electronic label using an ultrasonic location technique. In 330, the host system verifies that the electronic label is correctly located by comparing a calculated location of the electronic label with a known location of merchandise associated with the electronic label.

Figure 4:
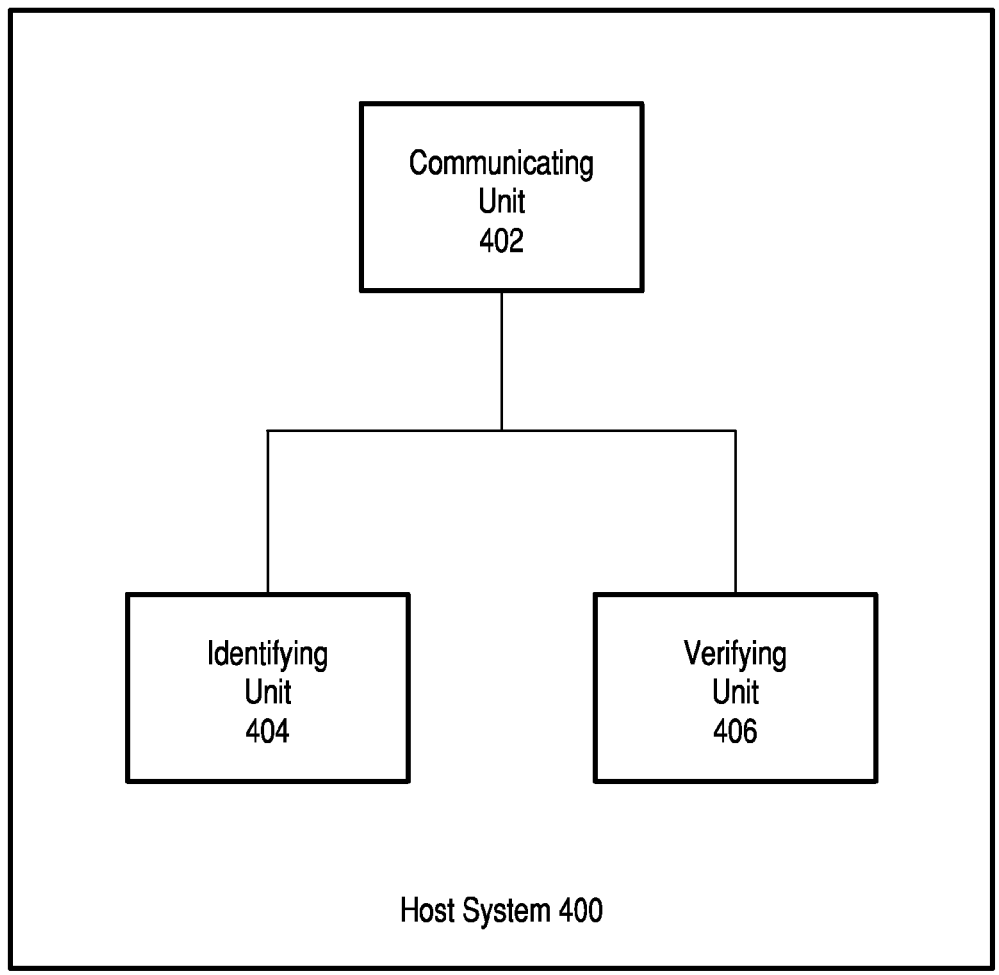
FIG. 4 is a block diagram of a host system configured to determine and verify a location of an electronic label.

FIG. 4 is a block diagram of a host system configured to determine and verify a location of an electronic label. The host system includes a communication unit 402, an identifying unit 404 and a verifying unit 406. Communication unit 402 is configured to exchange information with the electronic label via ultrasonic data communication. Identifying unit 404 is configured to identify a location of the electronic label using an ultrasonic location technique. Verifying unit 406 is configured to verify that the electronic label is correctly located by comparing a calculated location of the electronic label with a known location of merchandise associated with the electronic label.

Host system 400, for example, can be an integrated unit containing at least all the elements depicted in FIG. 4, as well as any other elements necessary for the host system to perform its particular functions. Alternatively, host system 400 can include a collection of appropriately interconnected units or devices, wherein such units or devices perform functions that are equivalent to the functions performed by the elements of the host system 400. In some embodiments, host system 400 may include a random access memory and a programmable memory that are coupled to a processor. The processor may include ports for coupling to wireless network interfaces. The wireless network interfaces can be used to enable host system 400 to communicate with other node devices in an ad hoc wireless network or mesh network. The programmable memory can store operating code (OC) for the processor and code for performing functions associated with host system 400. For example, the programmable memory can include computer readable program code components configured to cause execution of a method for determining and verifying the location of an ultrasonic electronic label as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a host system for determining and verifying a location of an electronic label, the method comprising:
    establishing known locations of merchandise;
    exchanging information between with the electronic label and at least one ultrasonic access point among multiple ultrasonic access points in the host system via ultrasonic data communication in encoded ultrasonic waveforms;
    calculating a single location of the electronic label using an ultrasonic location technique using distances calculated for an ultrasonic data communications signal received by said multiple ultrasonic access points from the electronic label; and
    verifying that the electronic label is correctly located by comparing the calculated single location of the electronic label with the known location of the merchandise associated with the electronic label; and
    reporting a discrepancy for correction if the known location of merchandise associated with the electronic label is different from the calculated single location of the electronic label.

2. The method of claim 1, wherein verifying includes verifying that correct information is displayed on the identified electronic label.

3. The method of claim 1, wherein the ultrasonic location technique is a trilateration technique.

4. The method of claim 1, wherein the ultrasonic location technique is a quadlateration technique.

5. The method of claim 1, further comprising:
    broadcasting an encoded ultrasonic waveform from said multiple ultrasonic access points connected to the host system; and
    updating information displayed on the electronic label at least in part according to decoded information obtained from the encoded ultrasonic waveform.

6. The method of claim 1, wherein the electronic label is affixed or attached to one of a product, a display object, enterprise infrastructure, or the merchandise.

7. The method of claim 1, wherein the electronic label functionality includes electronic article surveillance functionality that includes ultrasonic electronic sensors that can be deactivated or detached at a point of sale system when the merchandise attached with the ultrasonic label is purchased.

8. A system configured to determine and verify a location of an electronic label, the system comprising:
    at least one electronic label affixed to merchandise at known locations; and
    a host system including a host device and multiple ultrasonic access points wherein at least one ultrasonic access point that is configured to exchange information between with the electronic label and said at least one ultrasonic access point in the host system via ultrasonic data communication in encoded ultrasonic waveforms, wherein the host device is configured to calculate a single location of the electronic label using an ultrasonic location technique using distances calculated for an ultrasonic data communications signal received by said multiple ultrasonic access points from the electronic label, verify that the electronic label is correctly located by comparing the calculated single location of the electronic label with the known location of the merchandise associated with the electronic label, and report a discrepancy if the known location of merchandise associated with the electronic label is different from the calculated single location of the electronic label.

9. The system of claim 8, wherein the electronic label includes an ultrasonic transceiver, processor module, information display, and a power source.

10. The system of claim 8, wherein the host device system is configured to verify that correct information is displayed on the identified electronic label.

11. The system of claim 8, wherein the ultrasonic location technique is a trilateration technique.

12. The system of claim 8, wherein the ultrasonic location technique is a quadlateration technique.

13. A host system configured to determine and verify a location of an electronic label, the host system comprising:
    multiple ultrasonic access points wherein at least one ultrasonic access point is configured to exchange information with the electronic label via ultrasonic data communication in encoded ultrasonic waveforms; and a host device configured to establish known locations of merchandise, calculate a single location of the electronic label using an ultrasonic location technique using distances calculated for an ultrasonic data communications signal received by said multiple ultrasonic access points from the electronic label, verify that the electronic label is correctly located by comparing the calculated single location of the electronic label with the known location of the merchandise associated with the electronic label, and report a discrepancy if the known location of merchandise associated with the electronic label is different from the calculated single location of the electronic label.

14. The host system of claim 13, wherein the host device is configured to verify that correct information is displayed on the identified electronic label.

15. The host system of claim 13, wherein the ultrasonic location technique is a trilateration technique.

16. The host system of claim 13, wherein ultrasonic location technique is a quadlateration technique.

17. The method of claim 1, wherein the electronic label includes a piezo electric element configured to generate sound waves in the ultrasonic range above 18,000 hertz.

* * * * *